United States Patent
Brezger et al.

(10) Patent No.: US 11,047,432 B2
(45) Date of Patent: Jun. 29, 2021

(54) FREEWHEEL (71) Applicant: BorgWarner Inc., Auburn Hills, MI (US)

(72) Inventors: Friedrich Philipp Brezger, Karlsruhe (DE); Fabian Meinzer, Mannheim (DE); Oliver Groneberg, Waldsee (DE)

(73) Assignee: BorgWarner Inc., Auburn Hills, MI (US)

( * ) Notice: Subject to any disclaimer, the term of this patent is extended or adjusted under 35 U.S.C. 154(b) by 29 days.

(21) Appl. No.: 16/408,793

(22) Filed: May 10, 2019

(65) Prior Publication Data
US 2019/0345995 A1 Nov. 14, 2019

(30) Foreign Application Priority Data

May 11, 2018 (DE) .......................... 102018003819.0

(51) Int. Cl.
*F16D 41/069* (2006.01)
*F16D 41/06* (2006.01)
(Continued)

(52) U.S. Cl.
CPC .......... *F16D 41/069* (2013.01); *F16D 41/084* (2013.01); *F16D 41/14* (2013.01); *F16D 2041/0603* (2013.01)

(58) Field of Classification Search
CPC .... F16D 41/066; F16D 41/069; F16D 41/084; F16D 41/14; F16D 41/30; F16D 2041/0603; F16D 2041/0605; F16D 15/00
See application file for complete search history.

(56) References Cited

U.S. PATENT DOCUMENTS 2,113,512 A 4/1938 Kesterton
2,291,151 A 7/1942 Dunn
(Continued)

FOREIGN PATENT DOCUMENTS

AT 123023 B 5/1931
CH 301095 A 8/1954
(Continued)

OTHER PUBLICATIONS

Machine-assisted English translation for AT 123 023 extracted from espacenet.com database on May 29, 2019, 5 pages.
(Continued)

*Primary Examiner* — Mark A Manley
(74) *Attorney, Agent, or Firm* — Howard & Howard Attorneys PLLC (57) ABSTRACT The present invention relates to a freewheel (2) comprising a first race (18), a second race (20), and clamping elements (42, 44) between the first and second races (18, 20), said clamping elements connected in rotational engagement with the first race (18), wherein the clamping elements (42, 44) consist of first clamping elements (42) which are able to move between a first position, in which the first race (18) is able to rotate in relation to the second race (20) in a first direction of rotation (52), and a second position, in which the first race (18) is coupled in rotational engagement with the second race (20) via at least one of said first clamping elements (42) in the first direction of rotation (52). At least one first clamping element (42) is designed to be elastically deformable.

17 Claims, 6 Drawing Sheets (51) Int. Cl.
*F16D 41/08* (2006.01)
*F16D 41/14* (2006.01)

(56) References Cited

U.S. PATENT DOCUMENTS

| | | | | |
|---|---|---|---|---|
| 3,589,486 | A | * | 6/1971 | Kelch ..................... F16D 41/18 |
| | | | | 192/46 |
| 5,257,685 | A | * | 11/1993 | Tichiaz ................. F02N 15/027 |
| | | | | 192/104 C |
| 5,590,550 | A | * | 1/1997 | Savkar .................... D06F 13/02 |
| | | | | 192/46 |
| 8,272,488 | B2 | | 9/2012 | Eisengruber et al. |
| 8,276,725 | B2 | * | 10/2012 | Swales .................... F16D 41/16 |
| | | | | 192/43.1 |
| 8,286,772 | B2 | | 10/2012 | Eisengruber |
| 9,151,339 | B2 | | 10/2015 | Lee et al. |
| 9,163,678 | B2 | | 10/2015 | Strong |
| 9,726,236 | B2 | | 8/2017 | Papania |
| 2002/0027055 | A1 | | 3/2002 | Le-Calve et al. |
| 2010/0181157 | A1 | * | 7/2010 | Smetana ............... F16D 41/125 |
| | | | | 192/46 |
| 2013/0248317 | A1 | | 9/2013 | Lee |
| 2015/0323020 | A1 | | 11/2015 | Papania |
| 2018/0347644 | A1 | | 12/2018 | Brezger et al. |

FOREIGN PATENT DOCUMENTS

| | | |
|---|---|---|
| CH | 318951 A | 1/1957 |
| CN | 104981623 A | 10/2015 |
| DE | 102004047803 A1 | 3/2006 |
| DE | 102013219880 B4 | 9/2015 |
| DE | 112014002308 T5 | 3/2016 |
| EP | 2951456 B1 | 11/2017 |
| WO | 2014120595 A1 | 8/2014 |

OTHER PUBLICATIONS

Machine-assisted English translation for CH 301 095 extracted from espacenet.com database on May 29, 2019, 8 ages.

Machine-assisted English translation for CH 318 951 extracted from espacenet.com database on May 29, 2019, 7 pages.

English language abstract for CN 104981623 extracted from espacenet.com database on Jun. 3, 2019, 2 pages.

Machine-assisted English language abstract and machine-assisted English translation for DE 10 2004 047 803 extracted from espacenet.com database on May 10, 2019, 9 pages.

Machine-assisted English language abstract and machine-assisted English translation for DE 10 2013 219 880 extracted from espacenet.com database on May 10, 2019, 12 pages.

English language abstract for DE 11 2014 002 308 extracted from espacenet.com database on May 10, 2019, 1 page.

* cited by examiner

FREEWHEEL

CROSS-REFERENCE TO RELATED APPLICATIONS

This application claims the benefit of German Patent Application No. 102018003819.0 filed May 11, 2018, the disclosure of which is herein incorporated by reference in its entirety.

DESCRIPTION

The present invention relates to a freewheel comprising a first race, a second race, and clamping elements between the first race and the second race, said clamping elements connected in rotational engagement with the first race, whereby the clamping elements consist of first clamping elements which are able to move between a first position, in which the first race is able to rotate in relation to the second race in a first direction of rotation, and a second position, in which the first race is coupled in rotational engagement with the second race via at least one of said first clamping elements in the first direction of rotation.

Freewheels, in particular ratcheting freewheels, are known in the prior art. These freewheels comprise a first race, for example an outer ring or an inner ring, and a second race, for example an inner ring or an outer ring. Clamping elements, for example clamping rollers, clamping bodies, or pawls connected in rotational engagement with the first race, are provided between the first race and the second race. The clamping elements in known freewheels can be moved, for example pivoted, between a first position, in which the first race is able to rotate in relation to the second race in a first direction of rotation, and a second position, in which the first race is coupled in rotational engagement with the second race via at least one of the clamping elements in the first direction of rotation.

In the known freewheels, more particularly in those known as positive locking clutches or ratcheting freewheels, it has been shown that the coupling for rotational engagement does not take place via all of the clamping elements in the second position. Instead, due to manufacturing tolerances in the area of the clamping elements and/or the races, typically only a few or even only one of the clamping elements are involved, resulting in particularly high stress on individual clamping elements and on the areas of the races where the clamping element is supported. This can cause damage to the highly-stressed clamping element and to the supporting area of the race. In the past, large and rigid clamping elements that were typically made of relatively high-quality material needed to be used in order to deal with this problem, which ultimately led to greater dimensions for the freewheel as well as to increased manufacturing costs.

Therefore, it is an object of the present invention to improve a freewheel of the type specified in a way that provides a freewheel having smaller dimensions while also making it possible to largely prevent damage to the race.

This object is achieved by means of the features specified in claim 1. Advantageous embodiments of the invention are the subject-matter of the dependent claims.

The freewheel according to invention, which is preferably designed as a positive locking clutch or a ratcheting freewheel, comprises a first race and a second race. The first race can, for example, be an outer ring or an inner ring, whereas the second race can, for example, be an inner or an outer ring. Arranged between the first race and the second race are clamping elements, for example clamping rollers, clamping bodies, pawls, or claws, said elements preferably arranged in a radial direction between the first race and the second race. The clamping elements are thereby connected in rotational engagement with the first race of the freewheel. The clamping elements consist of a specific number of first clamping elements. In the simplest variation, for example, all of the clamping elements can be made up of said first clamping elements. The first clamping elements can be moved in relation to the first race between a first position and a second position. In this context, the first clamping elements are preferably able to be pivoted between the first position and the second position. In the first position, the first clamping elements are arranged in a way that the first race can be rotated in relation to the second race in the first direction of rotation. Conversely, in the second position of the first clamping elements, the first race is coupled in rotational engagement via at least one of the first clamping elements in the first direction of rotation, preferably in a positive locking manner, with the result that rotation of the first race in the first direction of rotation is able to cause similar rotation of the second race in the first direction of rotation. In order to prevent manufacturing tolerances respecting both the races and the clamping elements from resulting in a situation where only individual first clamping elements (or even just a single first clamping element) are contributing to the coupling for rotational engagement and being highly stressed thereby, at least one first clamping element is designed to be elastically deformable. This design applies both to design variations in which the entire clamping element is elastically deformable and to design variations in which only a portion of the first clamping element is elastically deformable, whereas another portion is not elastically deformable. The former design variation is advantageous in terms of simplified manufacture, whereas the latter design variation enables particularly selective deformation of the first clamping element and, subsequent to said deformation, enables a particularly strong supporting force via the portion that is not elastically deformable. In addition, the advantages of the latter design variation further apply to design variations in which portions of varying elasticity or stiffness are used and which are likewise included in the present invention. Regardless of the respective design variation chosen, elastic deformation of the first clamping element that first performs coupling for rotational engagement in the second position has the effect, due to the elastic deformation of said first clamping element, of enabling at least a slight change in the relative rotational position between the first race and the second race such that other first elastic clamping elements in addition to the elastically deformed first clamping element become engaged and, as a result, contribute to the coupling for rotational engagement. Doing so has the result of both relieving stress on the first clamping element that comes into engagement as well as enabling uniform coupling for rotational engagement via a maximum number of first clamping elements. Since the load can in this way be distributed across a plurality of or even all of the first clamping elements, both the first clamping elements and the races can have correspondingly small dimensions. Damage to the first clamping elements and the races is largely precluded while also enabling a correspondingly compact structure. Although consistent mention is made herein of at least one elastically deformable first clamping element, it is nevertheless preferable for a plurality of the first clamping elements, in particular all of the first clamping elements, to be elastically deformable, particularly given that one cannot predict which of the first clamping elements will first perform coupling for rotational engagement in the second position. This essentially depends on the respective relative rotational position between the first race and the second race, which is variable.

As previously indicated, the clamping elements of the freewheel may be made up exclusively of the first clamping elements. However, in a preferential embodiment of the freewheel according to the invention, the clamping elements of the freewheel further consist of second clamping elements, which are able to move between a first position, in which the first race is able to rotate in relation to the second race in a second direction of rotation, and a second position, in which the first race is coupled in rotational engagement with the second race via at least one of said second clamping elements in the second direction of rotation. In this context, the second direction of rotation refers to the direction of rotation opposing the first direction of rotation. Among the second clamping elements, at least one is also elastically deformable. The preceding statements regarding the first clamping elements apply in corresponding fashion with respect to possible design variations of the second clamping elements. It is furthermore preferable for the same number of first and second clamping elements to be provided in this embodiment. It has proven to be furthermore advantageous for the first and second clamping elements to alternate with one another in a circumferential direction, in which case it is particularly preferable for only one first clamping element to follow a second clamping element in a circumferential direction, whereas again only one first clamping element again follows the second clamping element in the same circumferential direction. In this context, it is again true that said at least one second clamping element is elastically deformable, in which case it is advantageous for a plurality of second clamping elements, or even all second clamping elements, to be elastically deformable.

In an advantageous embodiment of the freewheel according to the invention, the first and second clamping elements are able to move in an opposing direction from the first position into the second position and from the second position into the first position. In case the first and second clamping elements are pivotable, the first clamping elements would as a result be pivotable in a pivot direction from the first position into the second position, whereas the second clamping elements would be pivotable in an opposite pivot direction from the first position into the second position. Conversely, the first clamping elements would be pivotable in a pivot direction from the second position into the first position, whereas the second clamping elements would be pivotable in an opposite pivot direction from the second position into the first position.

In order to provide a freewheel able to be used in a particularly flexible manner, the freewheel is, in a preferential embodiment of the invention, operable in four operating modes. Therefore, the freewheel can preferably be operated in a first operating mode, in which the first race is able to be rotated in relation to the second race in both the first direction of rotation and the second, opposite direction of rotation. In this context, it is preferable for the first and second clamping elements to be arranged in the corresponding first position in the first operating mode. The freewheel can additionally be operated in a second operating mode, in which the first race in coupled in rotational engagement with the second race in the first direction of rotation and able to rotate in relation to the second race in the second direction of rotation. In this case, it is preferable for the first clamping elements to be arranged in the second position and for the second clamping elements to be arranged in the first position while in the second operating mode. In a third operating mode of the freewheel, the first race is able to rotate in relation to the second race in the first direction of rotation and is coupled in rotational engagement with the second race in the second direction of rotation, in which case it is preferable for the first clamping elements to be arranged in the aforementioned first position and for the second clamping elements to be arranged in the aforementioned second position. In a fourth operating mode, the first race is coupled in rotational engagement with the second race in both the first direction of rotation and the second direction of rotation, in which case it is preferable for the first and second clamping elements to be arranged in the aforementioned second position. In order to adjust said four operating modes, the freewheel is preferably provided with a corresponding adjustment means, which can be designed in the manner described in greater detail hereinafter.

In principle, the elastically deformable first clamping element and/or the elastically deformable second clamping element can be designed in a way that the elastic material thereof is compressed only in the direction of the supporting force and expands back in an opposing direction in the absence of the supporting force. However, in a particularly advantageous embodiment of the freewheel according to the invention, the elastically deformable first clamping element and/or the elastically deformable second clamping element is elastically bendable. The elasticity of the respective clamping element is in this way selectively adjustable even given a small installation space.

In a further particularly preferable embodiment of the freewheel according to the invention, at least the elastically deformable first clamping element and/or the elastically deformable second clamping element is designed to be arcuate or curved. By virtue of the arcuate or curved shape, the respective clamping element is provided with particularly simple elastic deformability, in particular elastic bendability, in addition to a space-saving structure.

In a further advantageous embodiment of the freewheel according to the invention, at least the elastically deformable first clamping element and/or the elastically deformable second clamping element is designed to be arcuate or curved in a way that a supporting force between the first race and the second race providing the coupling for rotational engagement can in the second position only be transmitted along an arcuate or curved force transmission path via the respective clamping element. Said another way, said supporting force is not able to be transmitted along a linear force transmission path via the respective clamping element. The advantage of this embodiment is that the elastic deformation of the clamping element designed to be arcuate or curved is able to take place in a predetermined portion thereof and in a particularly selective manner.

In a further advantageous embodiment of the freewheel according to the invention, at least the elastically deformable first clamping element and/or the elastically deformable second clamping element comprises a first end portion for supporting the respective clamping element on the first race in the second position, a second end portion for supporting the respective clamping element on the second race in the second position, and an intermediate portion between the first end portion and the second end portion, the cross-section of which has a greater axial area moment of inertia and/or a greater height than the cross-sections of the first and second end portions. The bending stress on said intermediate portion can be reduced in this way, thereby acting to prevent component failure in this area.

According to a further advantageous embodiment of the freewheel according to the invention that is based on the embodiment just described, the area moment of inertia and/or the height of the cross-sectional surface of the clamping element increases continuously and/or constantly with increasing distance from the two end portions.

In a further preferential embodiment of the freewheel according to the invention, the area moment of inertia and/or the height of the aforementioned cross-sectional surface is greatest in the middle of the respective clamping element. Alternatively or additionally, the area moment of inertia and/or the height of the aforementioned cross-sectional surface is greatest in the area of a pivot axis of the respective clamping element, about which axis the respective clamping element is pivotable between the first position and the second position. Alternatively or additionally, the area moment of inertia and/or the height of the aforementioned cross-sectional surface is greatest in an area where the bending stress on the respective clamping element is greatest.

In a further advantageous embodiment of the freewheel according to the invention, the area moment of inertia and/or the height of the aforementioned cross-sectional surface increases with increasing distance from the two end portions in a way that a uniform bending stress is achieved along the respective clamping element in order to avoid overstressing certain areas of the respective clamping element.

In a further preferential embodiment of the freewheel according to the invention, a protruding shoulder supportable on the first and/or second race is provided on the first and/or second end portion. By virtue of said protruding shoulder, the area of the end portions supportable on the respective race and, therefore, the area where the supporting force is introduced, is predetermined in a relatively precise manner, with the result that the elastic deformation behavior or the elastic bending behavior of the respective clamping element can be predetermined in a relatively precise manner. Regarding this embodiment, it has proven to be preferable for the respective protruding shoulder to protrude from an upper side of the clamping element that bulges out due to said arcuate or curved shape. Regarding this embodiment, it is also preferable for the protruding shoulder to have a curved or arcuate supporting surface, via which the protruding shoulder is supported or supportable on the respective race. As a result, any pivoting behavior by the clamping element can in particular be taken into account without significantly changing the supporting surface between the protruding shoulder and the respective race. As a further result, the deformation or bending behavior of the respective clamping element can be predetermined in a relatively precise manner during operation of the freewheel.

As previously indicated, at least the elastically deformable first clamping element and/or the elastically deformable second clamping element is, in an advantageous embodiment of the freewheel according to the invention, pivotable from the first position into the second position and from the second position into the first position. In this context, it has proven to be advantageous for at least the elastically deformable first clamping element and/or the elastically deformable second clamping element to be pivotably arranged on at least one side wall that is non-rotatably connected to the first race. The aforementioned side wall can, for example, be a side wall at least partially adjoining, in an axial direction, the gap between the first race and the second race which accommodates the clamping elements. In terms of particularly precise pivoting, it has in this context proven to be advantageous for at least the elastically deformable first clamping element and/or the elastically deformable second clamping element to be pivotably arranged on two side walls that are disposed opposite one another. In this case, the individual side wall or the two side walls can preferably be formed from a piece of sheet metal. In principle, at least one of the side walls can also be designed to be integral with the first race, but it has proven to be advantageous for both the single side wall and the side wall disposed opposite to have been subsequently secured to the first race in order to reduce manufacturing complexity. In particular, it has proven to be advantageous for a side wall to be formed from a piece of sheet metal, in particular a piece of sheet metal in the shape of an annular disc.

In a further preferential embodiment of the freewheel according to the invention in order to achieve a particularly simple structure for the freewheel, at least the elastically deformable first clamping element and/or the elastically deformable second clamping element extend into a recess within the side wall, optionally within both side walls, while bringing about a pivotable support. It is preferable in this case for the entire cross-section of the respective clamping element, of which it also consists within the annular gap between the first race and the second race, to extend into the recess. In this way, for example, a boss projecting in an axial direction on the respective clamping element can be omitted, resulting in a relatively simple structure for the clamping element and ensuring lower manufacturing complexity thereby.

In a further advantageous embodiment of the freewheel according to the invention, the recess is associated with a supporting element projecting into the recess, upon which the clamping element that extends into the recess is pivotably supported or supportable. As a result, the respective clamping element is correspondingly braced on the supporting element. In this case, the support of the clamping element on the supporting element preferably takes place by forming a pivot axis designed to be apart from the clamping element. In other words, the pivot axis of the respective clamping element preferably does not extend through the body of the clamping element, instead extending at most along the surface thereof. It has also proven particularly advantageous in this embodiment for the supporting element to be designed as integral with the side wall, particularly given that manufacturing complexity is reduced thereby since the supporting element can be manufactured in advance together with the recess in a straightforward manner by means of a suitable process for shaping the recess. In order to establish the pivot axis for the clamping element that extends into the recess in a relatively precise manner, the supporting element is preferably designed to narrow and/or taper to a point in the direction of the clamping element. Consequently, the support area of the clamping element on the supporting element is predefined in a relatively precise manner, with the result that the pivoting movement of the respective clamping element is also predefined in a relatively precise manner.

In a further particularly advantageous embodiment of the freewheel according to the invention, the recess is associated with a retaining element for axial support of the clamping element that extends into the recess. In principle, the retaining element may be formed from a separate component that is secured to the first race and/or one of the side walls, but it is preferable in this embodiment for the retaining element to be designed as integral with the side wall in order to reduce manufacturing complexity. Alternatively or in addition to the design integral with the side wall, it has in terms of easy construction also proven advantageous for the retaining element to have a tongue-like design. In this embodiment, it is furthermore preferable for the retaining element to be arranged at an offset in an axial direction with respect to the side wall. Designing the retaining element to be integral with the side wall, which is preferably formed from a piece of sheet metal, enables the retaining element to be, by means of shaping in an axial direction, offset in an axial direction in relation to the remaining areas of the side wall.

In a further advantageous embodiment of the freewheel according to the invention, an adjustment means is provided for adjusting the first clamping elements and/or the second clamping elements. Regarding the adjustment means, it is preferable for it to be able to assume four set positions, each of them being set in one of the previously described operating modes.

In principle, any adjustment means that allows selective adjustment of the operating mode is suitable for adjusting the first clamping elements and/or the second clamping elements. However, in a preferential embodiment of the freewheel according to the invention, the adjustment means comprises a positioning ring that is able to rotate in relation to the first race and has a positioning contour which interacts with the first and/or the second clamping elements. By virtue of such a positioning contour, which preferably deviates from a circular contour, the clamping elements can by way of the aforementioned operating modes be quite reliably shifted into the respective position intended for them and retained in this respective position. The aforementioned positioning contour can in this case interact either indirectly or directly with the respective clamping element.

In a further particularly advantageous embodiment of the freewheel according to the invention, the positioning contour interacts indirectly with the first and/or the second clamping elements, whereby the positioning contour interacts with the first and/or second clamping elements via translationally displaceable positioning pieces, for example translationally displaceable pistons in guides within the first race.

In a further preferential embodiment of the freewheel according to the invention, the first and/or second clamping elements are biased into their first or second position in order to facilitate positioning of the first clamping elements and/or the second clamping elements. In principle, any spring element is suitable in this case for biasing the respecting clamping element into the relevant position. In particular, it has in this case proven to be advantageous to use a torsion spring or a leg spring, respectively, for biasing the first and/or second clamping element into the first or second position.

In order to achieve particularly reliable coupling for rotational engagement between the first race and the second race in the second position of the clamping element, the first race and/or the second race has a supporting contour, which deviates from a circular contour and upon which the respective clamping element is supported or supportable in the second position thereof. In this context, a supporting contour in the form of a toothed contour has in particular proven to be advantageous.

The invention is explained in greater detail hereinafter by way of an illustrative embodiment and in reference to the attached drawings.

Shown are.

Figure 1:
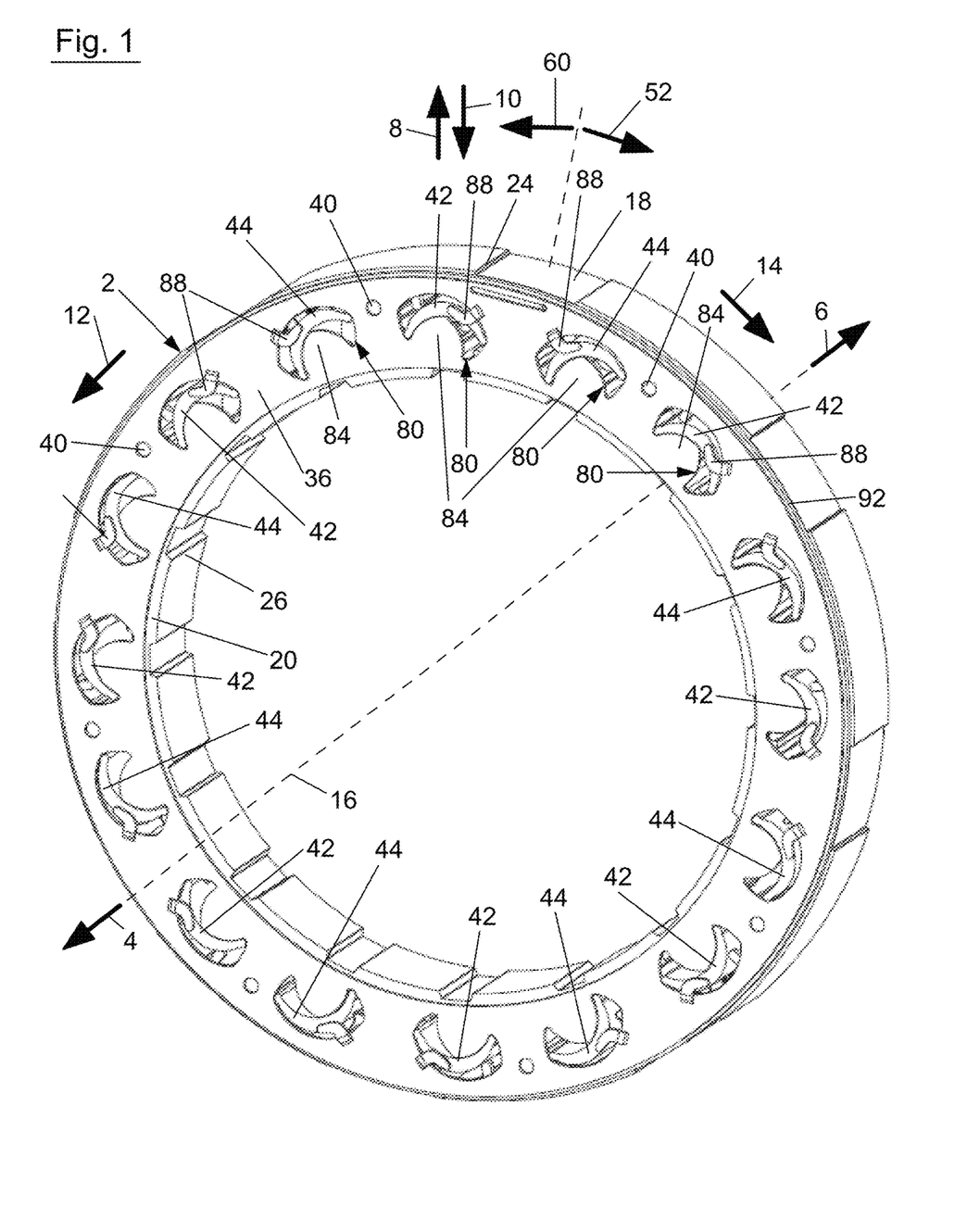
FIG. 1 a perspective view of an embodiment of the freewheel according to the invention with the first clamping element in the first position and the second clamping element in the second position, FIG. 2 a cross-sectional view of the freewheel in FIG. 1 with the first and second clamping elements in the second position, FIG. 3 an expanded view of area A in FIG. 2 with the first and second clamping elements in the first position, FIG. 4 area A from FIG. 3 with the first clamping element in the second position and the second clamping element in the first position, FIG. 5 area A from FIG. 3 with the first clamping element in the first position and the second clamping element in the second position, and FIG. 6 area A in FIG. 3 with the first clamping element and the second clamping element in the second position.
Figure 2:
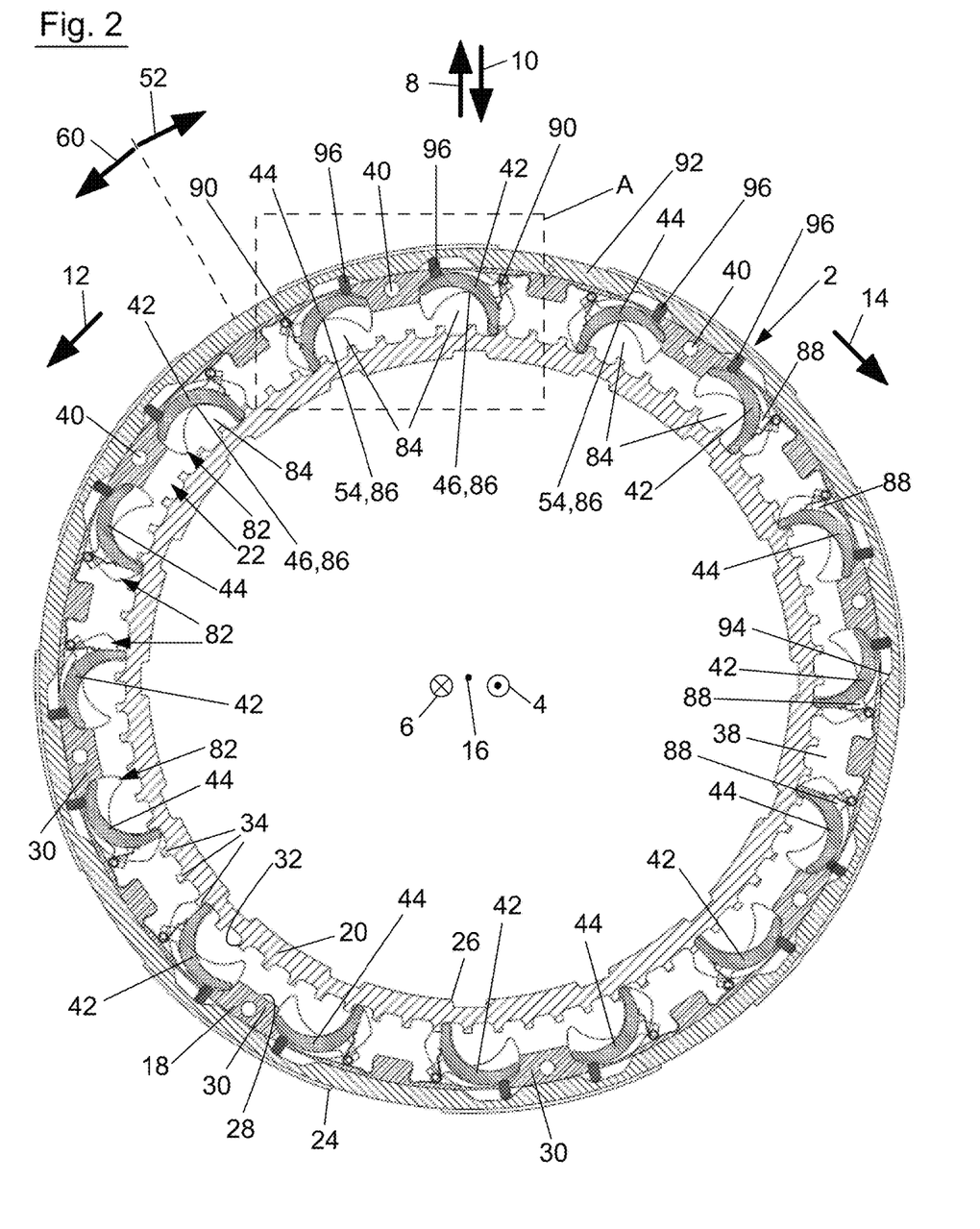

FIGS. 1 and 2 show perspective and cutaway views of a freewheel 2. The mutually opposing axial directions 4, 6, the mutually opposing radial directions 8, 10, and the mutually opposing circumferential directions 12, 14 of the freewheel 2 are indicated by way of corresponding arrows, in which context the components of the freewheel 2 are able to rotate about an axis of rotation 16 extending in the axial directions 4, 6.

The freewheel 2 comprises a first race 18, which extends essentially in the circumferential directions 12, 14 and is in this case designed as an outer ring situated outwards in a radial direction 8, and a second race 20, which extends essentially in the circumferential directions 12, 14 and is in this case designed as an inner ring situated inwards in a radial direction 10, with the result that the first race 18 outwardly surrounds the second race 20 in radial direction 8 while forming an intermediate space 22 which is situated between the two and extends essentially peripherally in circumferential direction 12, 14. Consequently, this can also be described as a radial nesting of the first and second races 18, 20.

The side of the first race 18 facing outwards in radial direction 8 comprises a contour for rotational engagement 24, in this case in the form of a toothed contour. In contrast, the side of the second race 20 facing inwards in radial direction 10 comprises a contour for rotational engagement 26, which is likewise designed in the manner of a toothed contour. Moreover, the side of the first race 18 facing the intermediate space 22 inwards in radial direction 10 has a supporting contour 28, which deviates from a circular contour and might also be referred to as a toothed contour, comprises a plurality of teeth 30 projecting inwards in radial direction 10. The side of the second race 20 facing the intermediate space 22 outwards in radial direction 8 likewise has a supporting contour 32, which deviates from a circular contour, said supporting contour 32 in turn comprising a plurality of teeth 34 spaced at intervals from one another in circumferential direction 12, 14.

Two side walls 36, 38 disposed opposite one another in axial direction 4, 6 are non-rotatably secured to the first race 18. More precisely, the side wall 36 is secured to the first race 18 in a way that said side wall at least partially adjoins the intermediate space 22 in axial direction 4, whereas the side wall 38 is secured to the first race 18 in a way that it at least partially adjoins the intermediate space 22 in axial direction 6. The two side walls 36, 38 are designed essentially in the shape of an annular disc, in which case the two side walls 36, 38 are preferably formed as sheet metal parts. In this case, the front faces of the two side walls 36, are preferably attached to the multiple teeth 30 of the supporting contour 28, as shown by way of example in FIGS. 1 and 2 in reference to the attachment points 40. In this case, the side walls 36, 38 can, for example, be screwed or welded onto the first race 18.

A plurality of clamping elements 42, 44 are arranged within the intermediate space 22 to be distributed between the first and second races 18, 20 in circumferential direction 12, 14, said clamping elements connected in rotational engagement with the first race 18. The clamping elements 42, 44 thus comprise first clamping elements 42 and second clamping elements 44, which alternate with one another in circumferential direction 12 or 14, with the result that, along the same circumferential direction 12 or 14, a first clamping element 42 will in each case follow a second clamping element 44 and a second clamping element 44 will follow a first clamping element 42.

Figure 3:
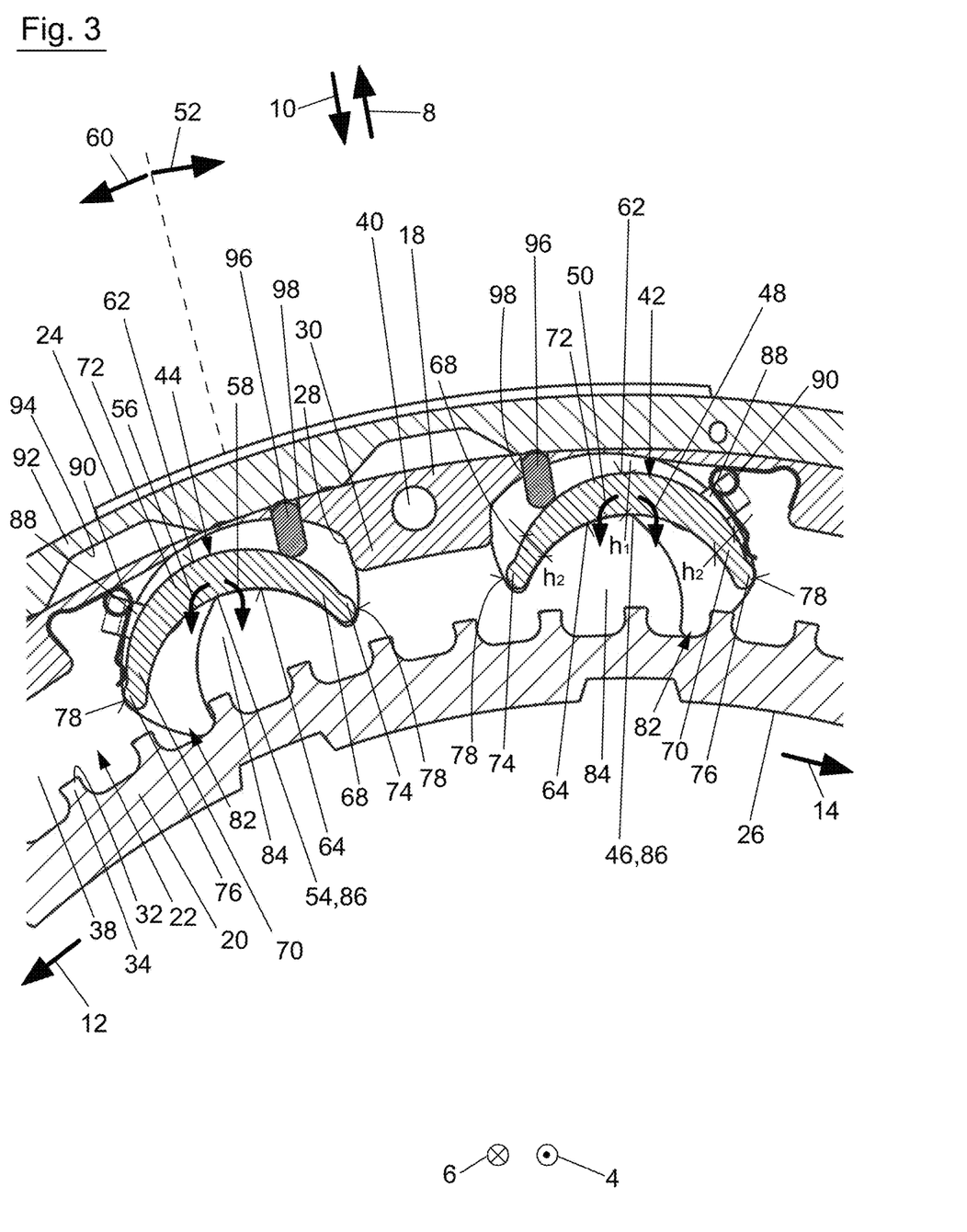
Figure 4:
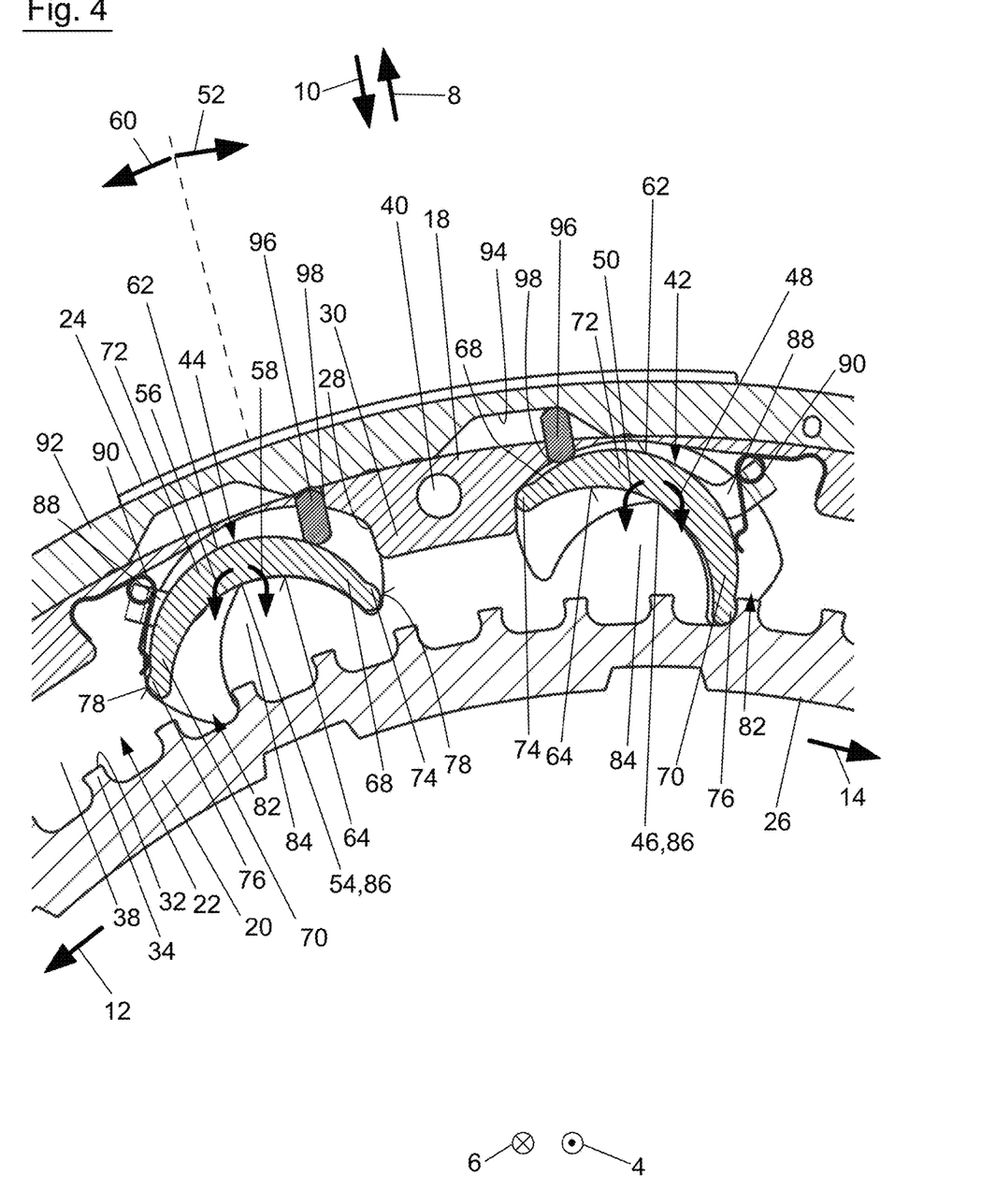
Figure 5:
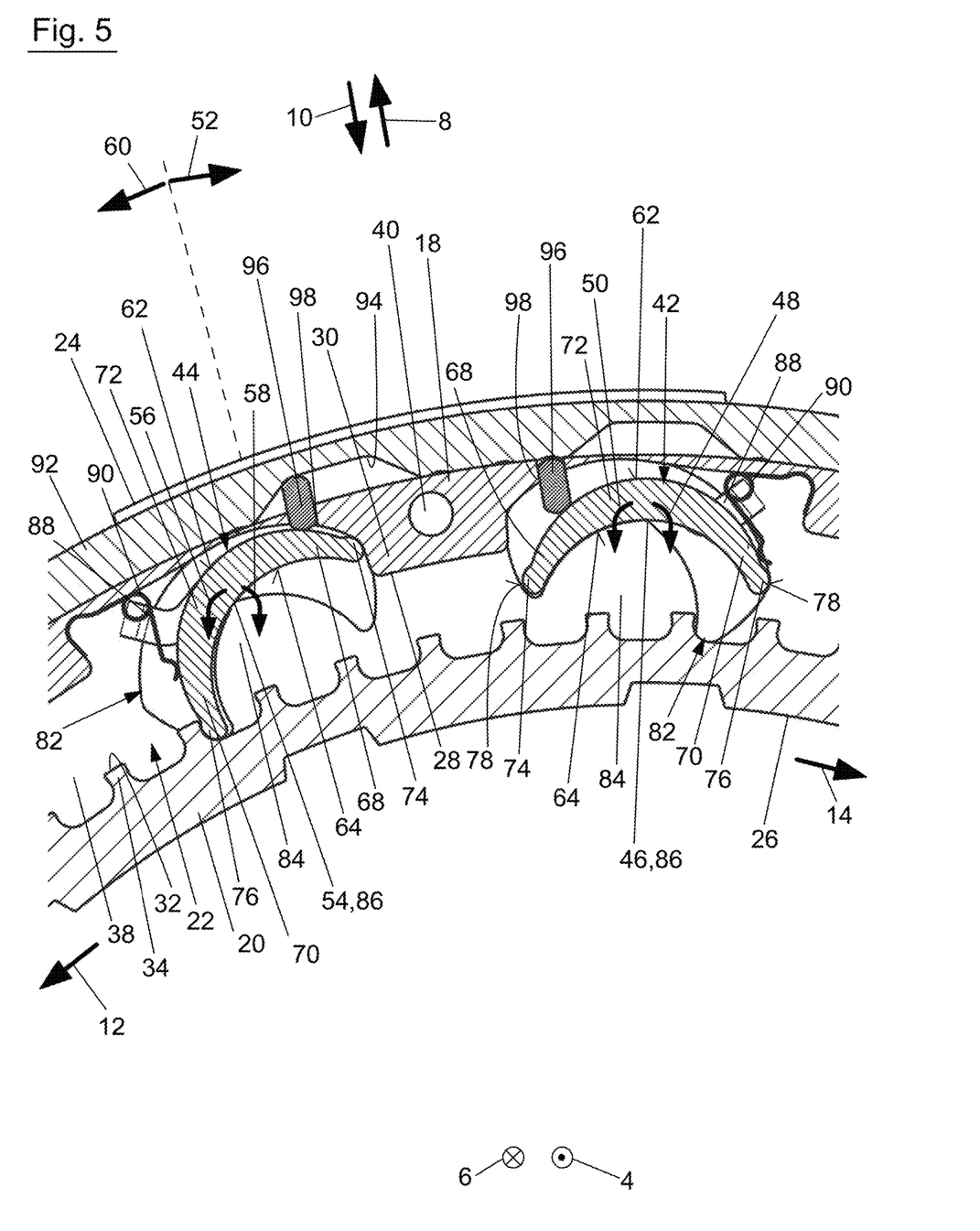
Figure 6:
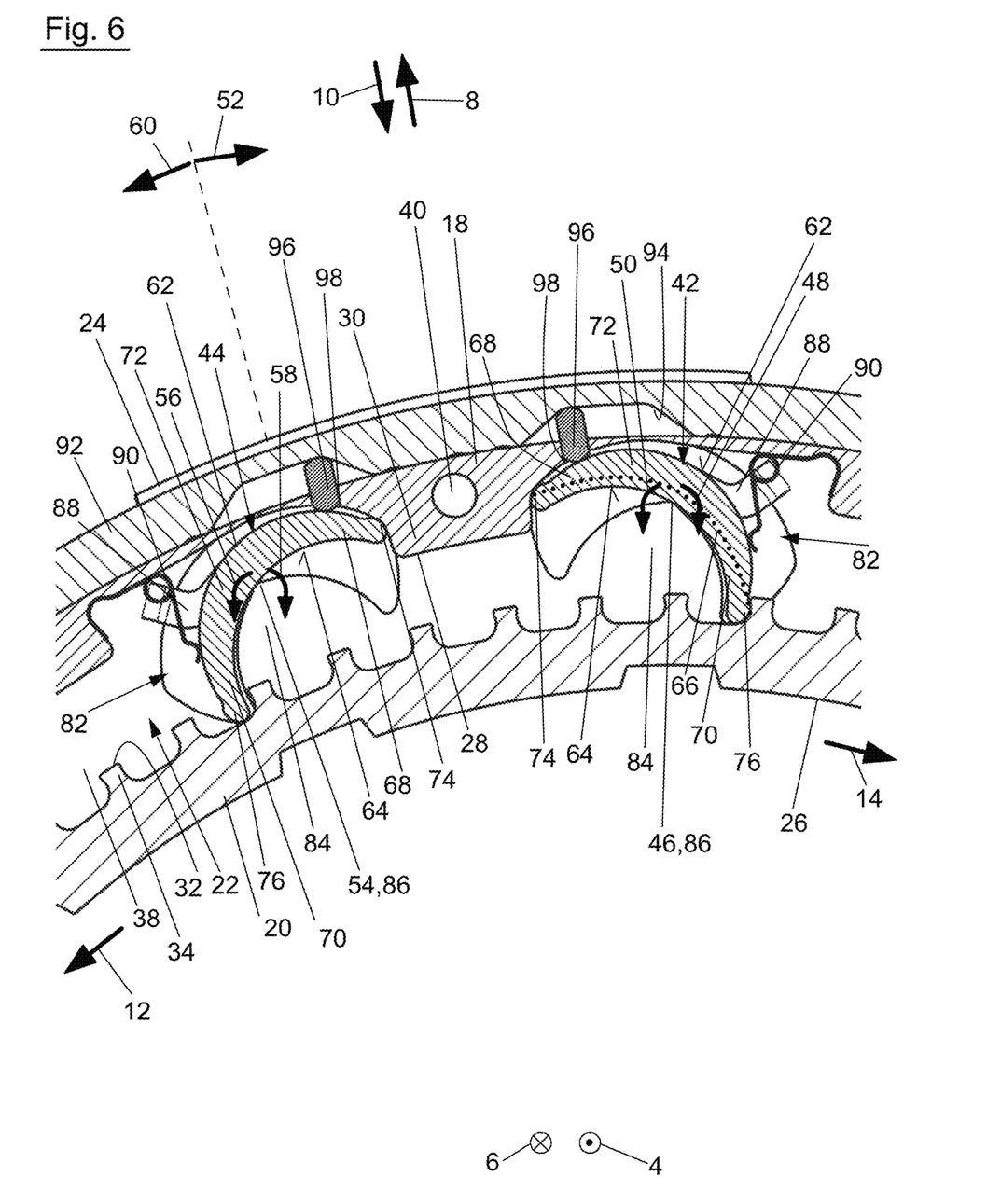

The first clamping elements 42 can be pivoted between a first position, which is shown in FIGS. 1, 3, and 5, and a second position, which is shown in FIGS. 2, 4 and 6. The first clamping elements 42 are in each case pivotable about a first pivot axis 46, which extends essentially in axial direction 4, 6, thus in a first pivot direction 48 from the first position into the second position, and in a second pivot direction 50 opposing the first pivot direction 48 from the second position into the first position. In the first position of the first clamping elements 42, the first race 18 is able to rotate in relation to the second race 20 in a first direction of rotation 52, whereas, in the second position of the first clamping elements 42, the first race 18 is coupled in rotational engagement with the second race 20 via at least one of the first clamping elements 42 in the first direction of rotation 52.

In contrast, the second clamping elements 44 are in each case pivotable about a second pivot axis 54 which extends essentially in the axial directions 4, 6 between a first position, which is shown in FIGS. 3 and 4, and a second position, which is shown in FIGS. 1, 2, 5 and 6. The second clamping elements 44 are in each case pivotable about a second pivot axis 54, thus in a first pivot direction 56 from the first position into the second position, and in a second pivot direction 58 opposite the first pivot direction 56 from the second position into the first position. In the first position of the second clamping elements 44, the first race 18 is able to rotate in relation to the second race 20 in a second direction of rotation 60 opposite the first direction of rotation 52, whereas, in the second position of the second clamping elements 44, the first race 18 is coupled in rotational engagement with the second race 20 via at least one of the second clamping elements 44.

The first and second clamping elements 42, 44 are in this case able to move or pivot in an opposing direction from the first position into the second position and from the second position into the first position. More precisely, the first pivot direction 48 of the first clamping elements 42 opposes the first pivot direction 56 of the second clamping elements 44, whereas the second pivot direction 50 of the first clamping elements 42 opposes the second pivot direction 58 of the second clamping elements 44. Moreover, both with respect to how they are shaped and with respect to their dimensions, the first and second clamping elements 42, 44 have the same design or are formed as identical parts. In addition, both the first clamping elements 42 and the second clamping elements 44 are designed to be elastically deformable; more precisely, the first and second clamping elements 42, 44 are elastically bendable, as will be explained in greater detail hereinafter.

The first and second clamping elements 42, 44, which can, for example, be shaped in a uniform manner from the same elastic material, are (as is evident in FIG. 3 in particular) arcuate or curved when viewed from the front. By virtue of said arcuate or curved shape, each of the clamping elements 42, 44 thus comprises an upper side 62 that bulges outwards and a lower side 64 that faces away from said upper side 62, in which case the lower side 64 bulges correspondingly inwards in relation to the cross-section of the clamping element 42, 44. In addition, as indicated in FIG. 3, the clamping elements 42, 44 preferably comprise a cross-section which remains constant in axial direction 4, 6. Furthermore, the first and second clamping elements 42, 44 are designed to be arcuate or curved such that, in the second position of the respective clamping element 42 and 44, a supporting force between the first and second races 18, can only be transmitted along an arcuate or curved force transmission path 66. The corresponding arcuate or curved force transmission path 66 is indicated by way of example in FIG. 6. In other words, the arcuate or curved shape is chosen in a way that no force whatsoever can be transmitted along a linear force transmission path via the respective clamping element 42, 44. The elastic bending of the respective clamping element 42, 44 is assisted thereby.

The clamping elements 42, 44 in each case comprise a first end portion 68 for supporting the respective clamping element 42, 44 on the first race 18 in the second position, and a second end portion 70 disposed opposite for supporting the respective clamping element 42, 44 on the second race 20 in the second position. An intermediate portion 72 is formed between the two end portions 68, 70. The cross-section of the intermediate portion 72 has a height $h_1$ between the upper side 62 and the lower side 64, whereas the two end portions 68, 70 each have a height $h_2$ between the upper side 62 and the lower side 64. As is evident from FIG. 3, the height $h_1$ of the intermediate portion 72 is greater than the height $h_2$ of the first and second end portions 68, 70 of the respective clamping element 42, 44. As a result, the cross-section of the intermediate portion 72 also has a greater axial area moment of inertia than is the case for the first and second end portions 68, 70. In addition, the area moment of inertia and/or the height of the cross-sectional surface of the respective clamping element 42, in each case increases continuously and constantly with increasing distance from the two end portions 68, 70 in the direction of the intermediate portion 72. The area moment of inertia and the height in the middle of the respective clamping element 42, 44 are in this case the greatest, whereby, in terms of the illustration, this corresponds to both the area of the associated pivot axis 46, 54 and even more so to the area of greatest bending stress for the respective clamping element 42, 44. In this context, constantly and/or continuously increasing the cross-sectional surface in the direction of the intermediate portion 72 preferably achieves uniform bending stress along the respective clamping element 42, 44 when a corresponding supporting force between the first and second races 18, 20 is applied to the clamping element 42, 44.

In deviation from the previously described continuous and constant increase in the cross-sectional surface of the respective clamping element 42, 44 with increasing distance from the end portions 68, 70 in the direction of the intermediate portion 72, a protruding shoulder 74, 76 is provided on both the first and the second end portions 68, 70, said shoulder protruding from the upper side 62 of the clamping element 42, 44, whereby the protruding shoulder 74 is supported or supportable on the first race 18 in the second position of the clamping element 42, 44, and the protruding shoulder 76 is supported or supportable on the second race 20 in the second position of the clamping element 42, 44, which can be gathered from, e.g., FIG. 5 for the case of protruding shoulder 74 and from, e.g., FIG. 4 for the case of protruding shoulder 76. The respective protruding shoulder 74, 76 also comprises an arcuate or curved supporting surface 78, which preferably nestles against a complementary shape on the respective supporting contour 28 or 32 when providing support.

As previously described, the clamping elements 42, 44 are in each case pivotable about a pivot axis 46 or 54 between the two aforementioned positions. For this purpose, the clamping elements 42, 44 are in each case pivotably arranged on the two side walls 36, 38 disposed opposite one another, in which context the clamping elements 42, 44 in each case extend in axial direction 4 into recesses 80 within the side wall 36 and in axial direction 6 into recess 82 within the side wall 38 while achieving said pivotable support on the side walls 36, 38. A bearing stub, which would extend in axial direction 4 or 6 into the respective mating piece, is provided on neither the clamping elements 42, 44 nor on the side walls 36, 38; instead, the entire cross-section of clamping element 42 or 44, which is preferably constant in axial direction 4 or 6, extends in axial direction 4, 6 into the recesses 80, 82. In order to achieve the pivotable support within the recess 80, 82, each of the recesses 80, 82 is associated with a supporting element 84 projecting into the recess 80, 82, upon which the lower side 64 of the clamping element 42, 44 that extends into the recess 80, 82 is pivotably supported about the respective pivot axis 46 or 54. Achieved thereby is a pivot axis 46 or 54, which is formed apart from the respective clamping element 42, 44, hence extending at most along a portion of the lower side 64 of the respective clamping element 42, 44. The supporting element 84 is in this case designed to be tongue-like, to be integral with the respective side wall 36, 38, and to narrow in the direction of the associated clamping element 42, 44. In this context, the support element 84 in the illustrated embodiment has a point 86, so it can also be described as a supporting element 84 designed to taper to a point. By means of the point 86, which can also be described as a corner and does not necessarily have to enclose an acute angle, the placement of the respective pivot axis 46, 54 on the side walls 36, 38 is predeterminable in a precise manner.

In order to prevent the clamping elements 42, 44 from being able to escape in axial direction 4 through the recesses 80 in the side wall 36 and in axial direction 6 through the recesses 82 in the side wall 38, the recesses 80, 82 are in each case further associated with a retaining element 88, in which case the ends of the clamping elements 42, 44 facing in axial directions 4 and 6 are in each case supported or supportable in a reliably fixed manner on the retaining elements 88 in the corresponding axial direction 4, 6. In this context, the retaining elements 88 are again designed to be integral with the respective side wall 36, 38. More precisely, the retaining elements 88 form a tongue-like portion of the respective side wall 36, 38, which portion is arranged at an offset in the respective axial direction 4 or 6 with respect to the recesses 80, 82 in order to enable the clamping elements 42, 44 to extend into the respective recess 80, 82 while nevertheless ensuring reliably fixed support in axial direction 4, 6. The tongue-like retaining elements 88 of the side walls 36, 38 are in this case curved in a way that their ends tend to extend in the direction of the pivot axis 46, 54, and the intermediate portion 72 of the respective clamping element 42, 44 is supported or supportable in axial direction 4 or 6 on the retaining element 88.

Both the first clamping elements 42 and the second clamping elements 44 are biased into their respective second position. For this purpose, the clamping elements 42, 44 are in each case associated with a spring element 90, which is supported or supportable in one respect on the first race 18 and is supported or supportable in another respect on the second end portion 70 of the respective clamping element 42, 44. Advantageously, said spring elements 90 are in the illustrated embodiment formed as a torsion spring or a leg spring. Moreover, an adjustment means is provided for adjusting the clamping elements 42, 44.

The adjustment means comprises a positioning ring 92 that is able to rotate about the axis of rotation 16 in relation to the first race 18 in circumferential direction 12, 14. The positioning ring 92 can in this case be driven in any manner desired, for example electrically or hydraulically, in order to rotate in a suitable manner in relation to the first race 18. In the illustrated embodiment, the positioning ring 92 is advantageously arranged in a groove, which is essentially adjoined in axial direction 4 by the side wall 36, in axial direction 6 by the first race 18, and inwards in radial direction 10 by the first race 18 and is formed peripherally in circumferential direction 12, 14. The positioning ring 92 can in this way be attached in a particularly straightforward manner before the side wall 36 is secured to the first race 18, thereby achieving a reliably fixed arrangement of the positioning ring 92 on the first race 18. The positioning ring 92 has a positioning contour 94, which deviates from a circular contour, interacts with the clamping elements 42, 44, and faces inward in radial direction 10, e.g., facing the clamping elements 42, 44. However, the positioning contour 94 does not interact directly with the clamping elements 42, 44, instead interacting with positioning pieces 96 that are displaceable in relation to the first race 18, which interact in one respect with the positioning contour 94 and in another respect with the first end portions 68 of the clamping elements 42, 44, more precisely with the upper side 62 in the area of the first end portions 68. The positioning pieces 96 are in this case translationally displaceable or adjustable positioning pieces 96 which are guided on the first race 18. Within guides 98 in the first race 18, the positioning pieces 96 shown herein are thus displaceable essentially in radial direction 8, 10.

The functioning of the freewheel 2 is described in greater detail hereinafter in reference to FIGS. 1 to 6. In this context, the freewheel 2 is operable in essentially four operating modes, which are adjustable via the previously described adjustment means.

The first operating mode is shown in FIG. 3. In the first operating mode, the positioning ring 92 is adjusted in a way that the first and second clamping elements 42, 44 are pivoted into the first position via the positioning pieces 96 and against the returning force of the spring elements 90, with the result that the first race 18 is able to rotate in relation to the second race 20 in both the first direction of rotation 52 and the opposing second direction of rotation 60.

In order to enter the second operating mode shown in FIG. 4, the positioning ring 92 is rotated in a suitable manner in relation to the first race 18, with the result that the second clamping elements 44 are still retained in their second position via the associated positioning piece 96 and against the spring force of the spring element 90, whereas the positioning piece 96 that is associated with the first clamping elements 42 retracts, with the result that the first clamping element 42 pivots about the first pivot axis 46 into its second position as a result of the spring force of the associated spring element 90. In the second position of the first clamping element 42, the first end portion 68 interacts in such a way with the supporting contour 28 on the first race 18, and the second end portion 70 of the first clamping element 42 interacts in such a way with the supporting contour 32 on the second race 20 that the first race 18 is coupled in rotational engagement with the second race 20 in the first direction of rotation 52. However, in the opposing second direction of rotation 60, the first race 18 is still able to rotate in relation to the second race 20, particularly given that the spring element 90 associated with the first clamping elements 42 permits the first clamping elements 42 to temporarily pivot out of the second position when the second end portion 70 strikes a tooth 34 of the supporting contour 32 in the second direction of rotation 60.

By means of further rotation of the positioning ring 92 in relation to the first race 18, the freewheel 2 is able to operate in a third operating mode, which is shown in FIG. 5 and corresponds to the reverse of the second operating mode shown in FIG. 4, with the result that the first race 18 is coupled in rotational engagement via the second clamping elements 44 in their second position in the second direction of rotation 60, whereas the first clamping elements 42 are arranged in their first position, with the result that, in the third operating mode, the first race 18 is able to rotate in relation to the second race 20 in the first direction of rotation 52.

FIG. 6 shows a fourth operating mode, in which the positioning ring 92 is rotated in relation to the first race 18 in a way that both positioning pieces 96 retract and the first clamping elements 42 as well as the second clamping elements 44 are pivoted into their second position by virtue of the positioning force of the respective associated spring elements 90, in which case the first race 18 is coupled in rotational engagement with the second race 20 via the first clamping elements 42 in the first direction of rotation 52 and via the second clamping elements 44 in the opposing second direction of rotation 60.

The advantageous effect of the elastically deformable or elastically bendable first and/or second clamping elements 42; 44 is particularly evident in those operating modes in which a coupling for rotational engagement between the first race 18 and the second race 20 is achieved via the first clamping elements 42 and/or second clamping elements 44, said advantageous effect to be described hereinafter in reference to the first clamping elements 42 in the second operating mode shown in FIG. 4, although said advantageous effect is true in corresponding fashion of the second clamping elements 44 when they are coupled in rotational engagement in the second direction of rotation 60.

If the freewheel 2 is shifted into the second mode of operation shown in FIG. 4 via the positioning ring 92, and the first race 18 completes a rotation in relation to the second race 20 in the first direction of rotation 52, then a coupling of the first race 18 in rotational engagement with the second race 20 in the first direction of rotation 52 is, due to manufacturing tolerances respecting the races 18, 20 and/or the first clamping elements 42, initially only achieved by only one of the first clamping elements 42. Consequently, a corresponding supporting force is transmitted between the first race 18 and the second race 20 via only one of the first clamping elements 42. However, by virtue of the elastic bendability of this first clamping element 42, the relatively strong supporting force acting between the first race 18 and the second race 20 enables said first clamping element 42 to bend in an elastic manner, with the result that, although a degree of coupling for rotational engagement does exist in the first direction of rotation 52 at this point, the elastic deformation of the first clamping element 42 to a certain extent enables further rotation of the first race 18 in relation to the second race 20 in the first direction of rotation 52. As a consequence of said further rotation, additional first clamping elements 42 will then come into contact with the supporting contours 28, 32 in the second position, with the result that said contours also contribute to a coupling for rotational engagement.

Consequently, a relatively uniform coupling for rotational engagement can by virtue of the elastic bendability of the first clamping elements 42 be achieved while overcoming any manufacturing tolerances or inaccuracies respecting the races 18, 20 and the first clamping elements 42. By virtue of said uniform coupling for rotational engagement, it is possible to distribute the load in a uniform manner across a plurality of or even all of the first clamping elements 42, with the result that both the first clamping elements 42 and the races 18, 20 can have relatively small dimensions without risking damage to the first clamping elements 42 and/or the races 18, 20.

As indicated earlier, the explanations made with respect to the first clamping elements 42 are true in corresponding fashion of the second clamping elements 44 in the second position thereof used to couple the first race 18 in rotational engagement with the second race 20 in the second direction of rotation 60, so reference is made in this context to the explanations made earlier herein.

LIST OF REFERENCE SIGNS

2 Freewheel
4 Axial direction
6 Axial direction
8 Radial direction
10 Radial direction
12 Circumferential direction
14 Circumferential direction
16 Axis of rotation
18 First race
20 Second race
22 Intermediate space
24 Contour for rotational engagement
26 Contour for rotational engagement
28 Supporting contour
30 Teeth
32 Supporting contour
34 Teeth
36 Side wall
38 Side wall
40 Attachment points
42 First clamping elements
44 Second clamping elements
46 First pivot axis
48 First pivot direction
50 Second pivot direction
52 First direction of rotation
54 Second pivot axis
56 First pivot direction
58 Second pivot direction
60 Second direction of rotation
62 Upper side
64 Lower side
66 Force transmission path
68 First end portion
70 Second end portion
72 Intermediate portion
74 Protruding shoulder
76 Protruding shoulder
78 Supporting surface
80 Recesses
82 Recesses
84 Supporting element 86 Point
88 Retaining element
90 Spring element
92 Positioning ring
94 Positioning contour
96 Positioning pieces
98 Guides
$h_1$ Height
$h_2$ Height

The invention claimed is:

1. A freewheel (2) comprising a first race (18), a second race (20), and first and second pivotable clamping elements (42, 44) between the first and second races (18, 20), said clamping elements connected in rotational engagement with the first race (18), wherein the clamping elements (42, 44) consist of first clamping elements (42) which are able to move between a first position, in which the first race (18) is able to rotate in relation to the second race (20) in a first direction of rotation (52), and a second position, in which the first race (18) is coupled in rotational engagement with the second race (20) via at least one of said first clamping elements (42) in the first direction of rotation (52), characterized in that at least one first clamping element (42) is elastically deformable such that the at least one first clamping element (42) is made of an elastic material that is compressed only in the direction of a supporting force and expands back in an opposing direction in the absence of the supporting force.

2. The freewheel (2) according to claim 1, characterized in that the first and second clamping elements (42, 44) further consist of second clamping elements (44) which are able to move between a first position, in which the first race (18) is able to rotate in relation to the second race (20) in a second direction of rotation (60), and a second position, in which the first race (18) is coupled in rotational engagement with the second race (20) via at least one of said clamping elements (44) in said second direction of rotation (60), wherein at least one second clamping element (44) is elastically deformable.

3. The freewheel (2) according to claim 1, characterized in that the freewheel (2) is operable in four operating modes, and in a first operating mode, in which the first race (18) is able to rotate in relation to the second race (20) in both the first direction of rotation and the second, opposite direction of rotation (52, 60), a second operating mode, in which the first race (18) is coupled in rotational engagement with the second race (20) in the first direction of rotation (52) and is able to rotate in relation to the second race (20) in the second direction of rotation (60), a third operating mode, in which the first race (18) is able to rotate in relation to the second race (20) in the first direction of rotation (52) and is coupled in rotational engagement with the second race (20) in the second direction of rotation (60), and a fourth operating mode, in which the first race (18) is coupled in rotational engagement with the second race (20) in both the first and second directions of rotation (52, 60).

4. The freewheel (2) according to claim 1, characterized in that the elastically deformable first clamping element 42 and/or an elastically deformable second clamping element (44) is elastically bendable.

5. The freewheel (2) according to claim 1 characterized in that at least the elastically deformable first clamping element (42) and/or an elastically deformable second clamping element (44) is designed to be arcuate or curved, wherein at least the elastically deformable clamping element (42) and/or the elastically deformable second clamping element (44) is designed to be arcuate or curved in a way that a supporting force between the first and second races (18, 20) can in the second position only be transmitted along an arcuate or curved force transmission path (66) via the respective clamping element (42, 44).

6. The freewheel (2) according to claim 5, characterized in that at least the elastically deformable first clamping element (42) and/or the elastically deformable second clamping element (44) comprises a first end portion (68) for supporting the respective clamping element (42, 44) on the first race (18) in the second position, a second end portion (70) for supporting the respective clamping element (42, 44) on the second race (20) in the second position, and an intermediate portion (72) between the first and second end portions (68, 70), the cross-section of which has a greater axial area moment of inertia and/or a greater height (h1) than the cross-sections of the first and second end portions (68, 70), wherein the area moment of inertia and/or the height (h1) of the cross-sectional surface increases continuously and/or constantly with increasing distance from the two end portions (68, 70), and/or in an area where the bending stress on the respective clamping element (42, 44) is greatest while achieving a uniform bending stress along the respective clamping element (42, 44).

7. The freewheel (2) according to claim 6, characterized in that a protruding shoulder (74, 76) supportable on the first and/or second race (18, 20) is provided on the first and/or second end portion (68, 70), wherein said protruding shoulder (74, 76) protrudes from an upper side (62) that bulges out due to said arcuate or curved shape.

8. The freewheel (2) according to claim 1, characterized in that at least the elastically deformable first clamping element (42) and/or the elastically deformable second clamping element (44) is pivotable from the first position into the second position, wherein at least the elastically deformable first clamping element (42) and/or the elastically deformable second clamping element (44) is pivotably arranged on at least one side wall (36, 38) that is non-rotatably connected to the first race (18), and at least the elastically deformable first clamping element (42) and/or the elastically deformable second clamping element (44) extends into a recess (80, 82) within the side wall (36, 38), while achieving a pivotable support.

9. The freewheel (2) according to claim 8, characterized in that the recess (80, 82) is associated with a supporting element (84) projecting into the recess (80, 82), upon which the clamping element (42, 44) that extends into the recess (80, 82) is supported or supportable, while forming a pivot axis (46, 54) designed to be apart from the clamping element (42, 44), wherein the supporting element (84) is designed to be integral with the side wall (36, 38), and/or to narrow and/or taper to a point in the direction of the clamping element (42, 44), and/or the recess (80, 82) is associated with a retaining element (88) for axial support of the clamping element (42, 44) that extends into the recess (80, 82).

10. The freewheel (2) according to claim 1, characterized in that an adjustment means is provided for adjusting the first clamping elements (42) and/or the second clamping elements (44), said adjustment means comprising a positioning ring (92) that is able to rotate in relation to the first race (18) and has a positioning contour (94) which interacts with the first and/or second clamping elements (42, 44), wherein the positioning contour (94) interacts with the first and/or second clamping elements (42, 44) via translationally displaceable positioning pieces (96), and/or the first and/or second clamping elements (42, 44) are biased into the first or second position, and/or the first and/or second race (18, 20) has a supporting contour (28, 32) that deviates from a circular contour.

11. The freewheel (2) according to claim 2, wherein the first and second clamping elements (42, 44) are able to move in an opposing direction from the first position into the second position and from the second position into the first position.

12. The freewheel (2) according to claim 3, wherein in the first operating mode, the first and second clamping elements (42, 44) are arranged in the first position, and in the second operating mode, the first clamping elements (42) are arranged in the second position and the second clamping elements (44) are arranged in the first position, and in the third operating mode, the first clamping elements (42) are arranged in the first position and the second clamping elements (44) are arranged in the second position, and in the fourth operating mode, the first and second clamping elements (42, 44) are arranged in the second position.

13. The freewheel (2) according to claim 6, wherein the area moment of inertia and/or the height (h1) is greatest in the intermediate portion (72), and/or in an area of a pivot axis (46, 54).

14. The freewheel (2) according to claim 7, wherein said protruding shoulder (74, 76) has an arcuate or curved supporting surface (78).

15. The freewheel (2) according to claim 8, wherein at least the elastically deformable first clamping element (42) and/or the elastically deformable second clamping element (44) is arranged on two side walls (36, 38) that are disposed opposite one another, and at least the elastically deformable first clamping element (42) and/or the elastically deformable second clamping element (44) extends into a recess (80, 82) within both side walls (36, 38) while achieving a pivotable support.

16. The freewheel (2) according to claim 9, wherein the retaining element (88) is designed to be integral with the side wall (36, 38) and/or have a tongue-like design at an offset in an axial direction (4, 6) with respect to the side wall (36, 38).

17. The freewheel (2) according to claim 10, wherein the first and/or second clamping elements (42, 44) are biased into the first or second position in each case by means of a torsion spring or a leg spring, and/or the first and/or second race (18, 20) has a toothed contour that deviates from a circular contour.

* * * * *